(12) United States Patent
Astigarraga et al.

(10) Patent No.: US 7,995,598 B2
(45) Date of Patent: Aug. 9, 2011

(54) SMALL FORM FACTOR PLUGGABLE (SFP) STATUS INDICATOR

(75) Inventors: Tara Astigarraga, Vail, AZ (US); David Franklin Dehaan, Tucson, AZ (US); Louie Arthur Dickens, Tucson, AZ (US); Omolaoye Olatunde, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 606 days.

(21) Appl. No.: 12/016,277

(22) Filed: Jan. 18, 2008

(65) Prior Publication Data

US 2009/0185498 A1   Jul. 23, 2009

(51) Int. Cl.
*H04L 12/56* (2006.01)
*H04L 12/66* (2006.01)
*H04B 10/08* (2006.01)
*H04B 10/12* (2006.01)
*H04B 10/00* (2006.01)

(52) U.S. Cl. ............ 370/419; 370/463; 398/16; 398/93; 398/162

(58) Field of Classification Search .......... 370/419–420, 370/463; 359/592–595, 597–598; 398/16, 398/25–35, 37–38, 93, 137, 162
See application file for complete search history.

(56) References Cited

U.S. PATENT DOCUMENTS

| | | | |
|---|---|---|---|
| 2003/0231888 A1* | 12/2003 | Takashina et al. | 398/149 |
| 2004/0032645 A1* | 2/2004 | Shirai | 359/341.3 |
| 2005/0105910 A1 | 5/2005 | Light | |
| 2006/0093359 A1* | 5/2006 | Lee et al. | 398/70 |
| 2006/0093372 A1* | 5/2006 | Hahin et al. | 398/135 |
| 2007/0092258 A1* | 4/2007 | Nelson | 398/135 |
| 2007/0098403 A1* | 5/2007 | Simanonis et al. | 398/45 |
| 2007/0123090 A1 | 5/2007 | Kim et al. | |
| 2007/0153823 A1 | 7/2007 | Wojtowicz | |

* cited by examiner

*Primary Examiner* — Thai D Hoang
(74) *Attorney, Agent, or Firm* — Griffiths & Seaton PLLC

(57) ABSTRACT

A small form factor pluggable (SFP) device includes a controller for receiving a first input signal. An optical loopback circuit is coupled to the controller for feeding back a loopback signal to the controller. The loopback signal is generated from the first input signal. An indicator is coupled to the controller for indicating a operational status of the device.

20 Claims, 2 Drawing Sheets

SMALL FORM FACTOR PLUGGABLE (SFP) STATUS INDICATOR

BACKGROUND OF THE INVENTION

1. Field of the Invention

The present invention relates in general to data communications, and more particularly to a status indicator for small form factor pluggable (SFP) standard compliant devices in a data communications network.

2. Description of the Prior Art

Small form factor pluggable (SFP) devices, such as SFP transceivers, are used in optical communications for both telecommunication and data communications applications. An SFP transceiver interfaces a network device (for a switch, router or similar device) to a fiber optic or unshielded twisted pair network cable. SFP is a popular industry format supported by several fiber optic component vendors. SFP transceivers are available with a variety of different transmitter and receiver types allowing users to select the appropriate transceiver for each link to provide the required optical reach over the available optical fiber type (e.g., multi-mode fiber or single-mode fiber. Optical SFP devices commonly support a variety of optical wavelengths. SFP transceivers are also available with a copper cable interface.

Currently, it is difficult to detect if an SFP device such as an SFP transceiver is operating properly while the device is being inserted into a network device (e.g., inserted in a port on a switch). A user is unable to ascertain whether an SFP transceiver is bad by physically looking at the transceiver in the port. Consequently, the user may spend time troubleshooting unnecessary or irrelevant steps in the hopes of obtaining an active connection.

SUMMARY OF THE INVENTION

A need exists for an apparatus, system and method for indicating the operational status of an SFP device that is observable by a user, for example while the SFP device is being inserted into the network device. Accordingly, in one embodiment, by way of example only, a small form factor pluggable (SFP) device includes a controller for receiving a first input signal. An optical loopback circuit is coupled to the controller for feeding back a loopback signal to the controller. The loopback signal is generated from the first input signal. An indicator is coupled to the controller for indicating a operational status of the device.

In another embodiment, again by way of example only, a method of indicating an operational status of a small form factor pluggable (SFP) device is provided. An optical loopback circuit is enabled in response to the detection of an input signal. An indicator is activated upon detection of a loopback signal.

In still another embodiment, again by way of example only, a system for indicating an operational status of a small form factor pluggable (SFP) transceiver device is provided. A controller is operational on the device. The controller is configured to enable an optical loopback circuit in response to detecting an input signal. The optical loopback circuit generates a loopback signal from the first input signal. The controller is further configured to activate the indicator upon detection of the loopback signal.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary apparatus, method and system embodiments for indicating an operational status for a small form factor pluggable (SFP) device, such as an SFP transceiver. These embodiments include an optical loopback circuit which is utilized to feed back input signals (loop back signals) to the device. The loopback circuit is activated when the device detects input signals, or deactivated when a cable (such as a fiber optic cable) is inserted into the device. Components of the device detect the feedback signal (loopback signal) and in turn activate an indicator, such as a light emitting diode (LED). The indicator continues to be activated so long as the input signal or loopback signal is detected.

Figure 1:
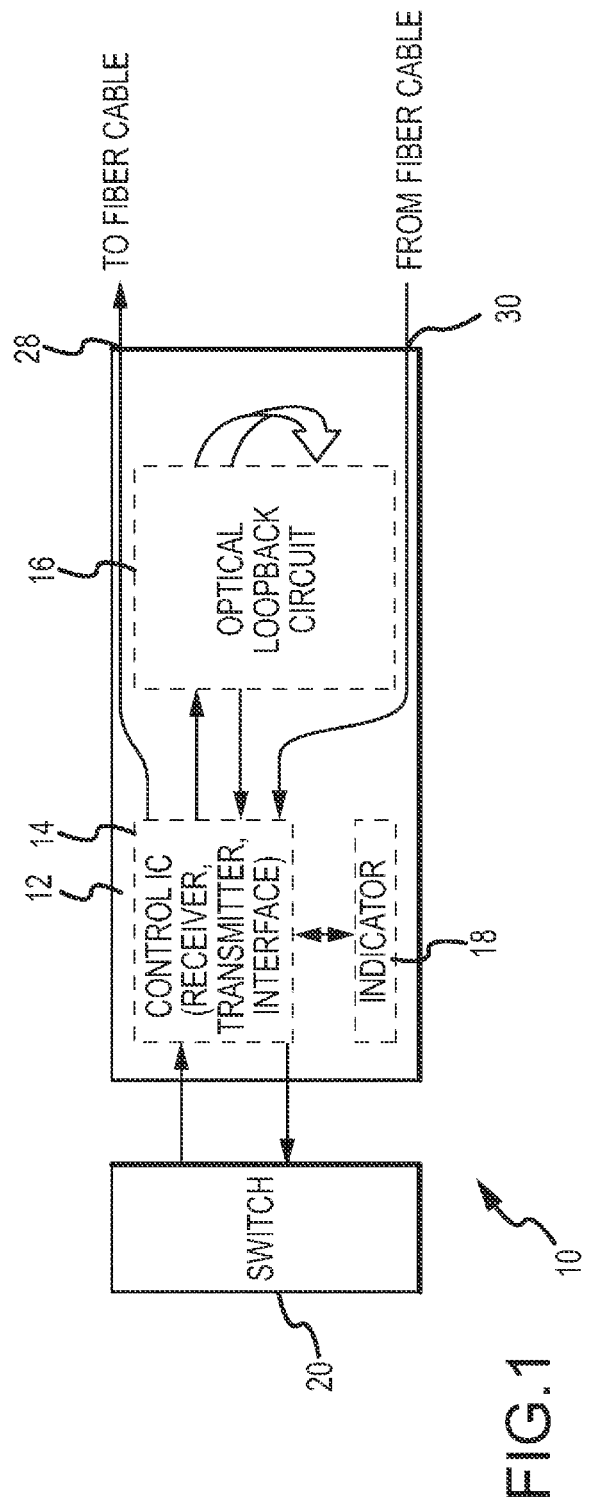
FIG. 1 is an exemplary block diagram of a small form factor pluggable (SFP) device connected to a network device.

FIG. 1 illustrates an exemplary SFP system 10 including an SFP device 12 connected to an exemplary network device 20 (e.g., switch 20). SFP device 12 includes a control integrated circuit (control IC) 14, or "controller" 14. The controller 14 may include various components, such as memory, a processing component configured as a transceiver (receiver and/or transmitter components), and the like. The controller 14 may also be referred to as a controller module 14 as the controller module may include or may utilize hardware, firmware, software, or a combination thereof to perform various operations associated with SFP device 12.

The controller 14 receives an input signal from a network device, such as the depicted switch 20. Device 12 may be inserted into a port of the switch 20 to make an electrical connection between the device 12 and the switch 20. In one embodiment, the input signal may be an electrical signal that is transmitted over a copper conductor from the port on switch 20. Once such an input signal is detected by the controller 14, the controller may enable an optical loopback circuit 16 that is coupled to the controller.

Optical loopback circuit 16 functions to feed back the input signal to such components as a receiver component of controller 14. For example, the input signal may be received from a port in switch 20 by controller 14. Once the controller 14 detects the input signal, the controller 14 may activate the optical loopback circuit 16. A portion of the input signal may be transferred to an external device via an external cable as described below (e.g., the input signal may be split) using a transmitter component of controller 14. The remaining portion of the signal may be passed to the circuit 16, where it is fed back to a receiver component of controller 14 as a loopback signal. Once such a loopback signal is received, the controller 14 is able to analyze the signal and determine if data signals are indeed being transferred. In one embodiment, these data signals may initially be network primitives as a new connection between the switch 20 and an external device is made.

The controller 14 also may be connected to an external cable, such as a fibre cable for data communications with an external device through cable connectors 28 and 30. Outgoing data is passed from the controller 14 through connector 28 to the external device. Incoming data is passed from the external device via connector 30 to the controller 14. The controller 14, through cable connectors 28, 30, or though other connections, may determine when such a fibre cable is inserted into the SFP device 12 as will be further described.

The controller is also coupled to an indicator module 18. The indicator module 18 provides various means for the activation and deactivation of indicators such as a light emitting diode (LED) indicator. In an LED embodiment, the LED may be positioned in a front-facing portion of the SFP device 12 as will also be further described. Once it is determined (e.g., though analysis of the loopback signal) that valid data signals are being transferred over the switch 20 connection, the indicator module 18 and/or controller 14 may activate the indicator to indicate that the SFP/SFP connection between the SFP and the network device is properly operational.

Figure 2:
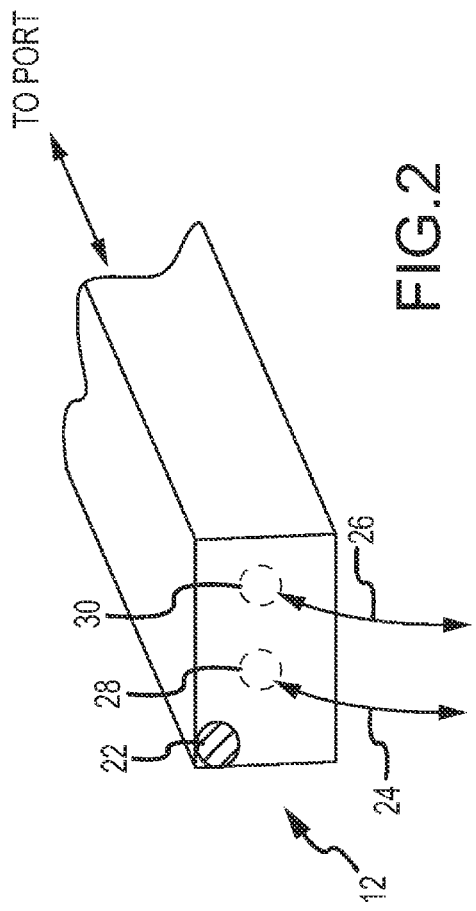
FIG. 2 is a three dimensional view of an exemplary SFP device.

FIG. 2 illustrates a three dimensional view of an exemplary SFP device 12. An LED 22 is positioned on a front portion of the SFP 12 as depicted. Ports 28 and 30 are shown coupled to fibre cables 24 and 26. LED 22 is positioned such that when a SFP 12 is inserted into a network device such as a port in a switch, the LED is visible to a user. LED may be configured according to a color scheme. For example, LED 22 may be configured to emit varying colors depending on a particular operational status as determined by the controller and/or indicator module.

For example, LED 22 may emit a green color when the SFP is initially plugged into the network device and the SFP is operating properly. If the SFP or the SFP connection is inoperable, the LED 22 may be configured such that the green light is disabled (goes completely off) while the SFP is plugged into the network device. In another embodiment, the LED may be configured to emit a red color if the SFP or the SFP connection is not operational.

Figure 3:
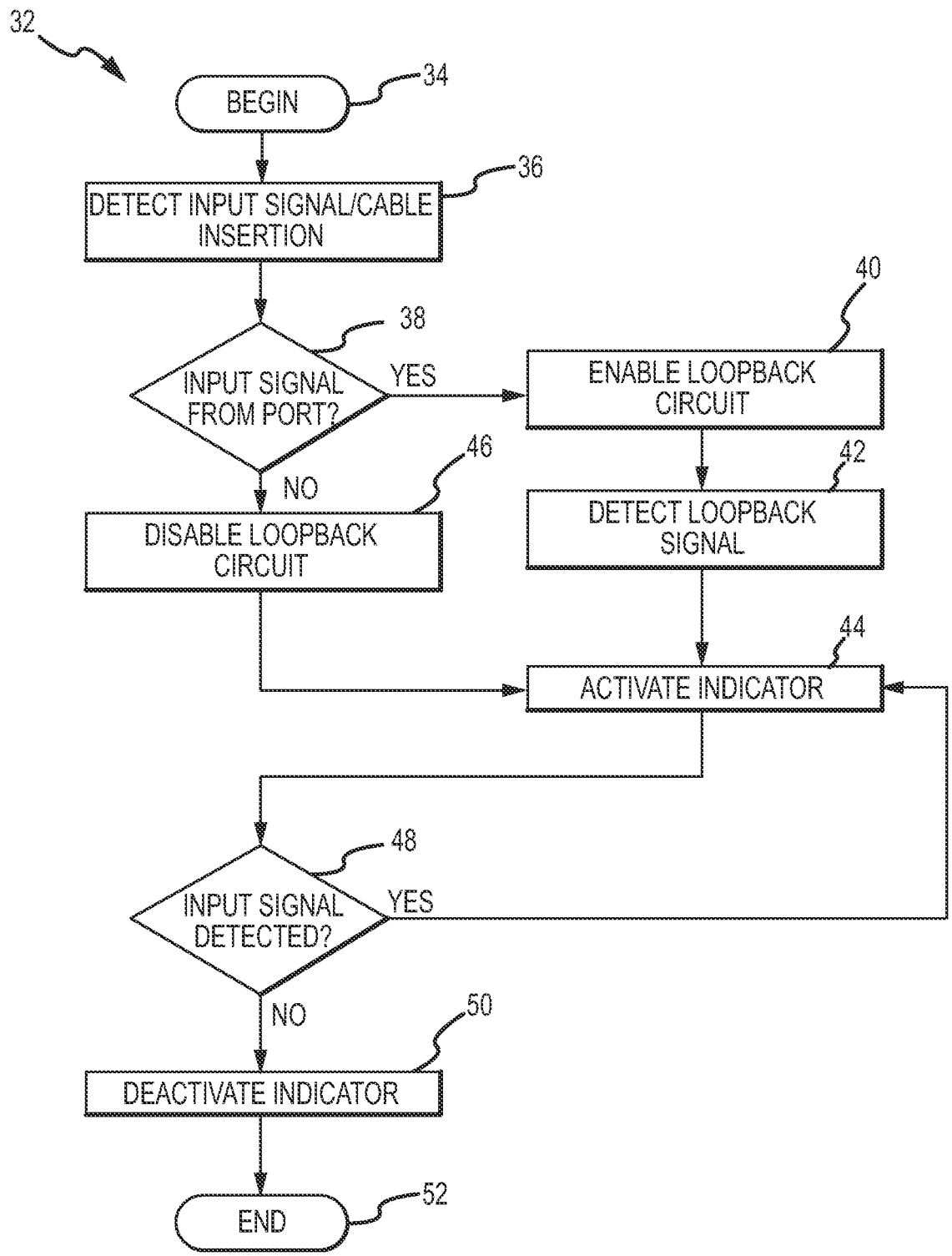
FIG. 3 is an exemplary method of indicating operational status for a SFP device.

Turning to FIG. 3, an exemplary method 32 for indicating an operational status of an SFP device is illustrated. Method 32 begins (step 34) by the SFP device (controller) detecting an input signal and/or cable insertion (step 36). If the controller determines that the input signal is received from the port of the network device (i.e., no cable insertion has occurred) (step 38), the controller enables the loopback circuit (step 40). The input signal may be split between the loopback circuit and an external fibre cable connector as previously described.

As a next step, a transmitter component of the controller transmits the input signal through the loopback circuit, where the signal is detected as a loopback signal by a receiver component of the controller (step 42). The controller may then analyze the loopback signal to determine if the loopback signal is a valid data signal (i.e., examine the signal for network primitives). Once the controller determines that the signal is valid, the controller and/or indicator module activate the indicator (step 44). For example, in one embodiment, a green LED indicator is activated (lit).

Returning to step 36, if a cable such as a fibre cable is inserted into the SFP and detected (instead of the alternative scenario described above), the method 32 determines that the input signal is not received from a port on the network device (again step 38). In this scenario, the controller disables the loopback circuit and detects an incoming signal from an attached device over the cable (step 46). The method 32 then activates the indicator as previously described (again step 44).

Method 32 continues to enable the indicator for so long as the input signal (in the case of an inserted cable) or loopback signal (in the case of a signal received from the attached network device port) is detected (step 48). As soon as an input signal or loopback signal is no longer detected, the indicator is deactivated (step 50). Method 32 then ends (step 52).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A small form factor pluggable (SFP) device, comprising:
   a controller for receiving an input signal;
   an optical loopback circuit coupled to the controller for feeding back a loopback signal to the controller, the loopback signal generated from the input signal, wherein the controller disables the optical loopback circuit upon detection of a cable insertion; and
   an indicator coupled to the controller for indicating a operational status of the device, wherein the indicator is adapted to be enabled so long as the loopback signal is detected.

2. The device of claim 1, wherein the controller further includes an interface for data communication.

3. The device of claim 1, wherein the controller includes a transceiver for sending and receiving data.

4. The device of claim 1, wherein the indicator is a light emitting diode (LED) configured according to a color scheme.

5. The device of claim 1, wherein the controller enables the optical loopback circuit upon detection of the input signal.

6. The device of claim 1, wherein the controller activates the indicator upon detection of the loopback signal.

7. The device of claim 1, wherein the input signal is split between the optical loopback circuit and the inserted cable.

8. A method of indicating an operational status of a small form factor pluggable (SFP) device, comprising:
- enabling an optical loopback circuit in response to detecting an input signal;
- activating an indicator upon detection of a loopback signal;
- disabling the optical loopback circuit upon detection of a cable insertion; and
- continuing to enable the indicator so long as the loopback signal is detected.

9. The method of claim 8, further including the input signal may be split between the optical loopback circuit and an inserted cable.

10. The method of claim 8, wherein detecting an input signal includes detecting an input signal received from a port of a network device or detecting an input signal received from a connected device over an inserted cable.

11. The method of claim 8, wherein activating an indicator upon detection of a loopback signal includes activating a light emitting diode (LED).

12. The method of claim 8, further including analyzing the loopback signal to determine the validity of the loopback signal, wherein the indicator is activated upon determining the loopback signal is valid.

13. A system for indicating an operational status of a small form factor pluggable (SFP) transceiver device, comprising:
- a controller operational on the device, the controller configured to:
  - enable an optical loopback circuit in response to detecting a first input signal, the optical loopback circuit generating a loopback signal from the first input signal;
  - activate an indicator upon detection of the loopback signal;
  - disable the optical loopback circuit upon detection of a cable insertion; and
  - continue to enable the indicator so long as the loopback signal is detected.

14. The system of claim 13, wherein the detecting an input signal includes detecting an input signal received from a port of a network device or detecting an input signal received from a connected device over an inserted cable.

15. The system of claim 14, wherein the controller is further configured to continue to activate the indicator so long as the second input signal is detected.

16. The system of claim 13, wherein the indicator is a light emitting diode (LED) configured according to a color scheme.

17. The system of claim 13, wherein the controller includes an interface for data communication.

18. The system of claim 13, wherein the controller includes a transmitter for transmitting data.

19. The system of claim 13, wherein the controller includes a receiver for receiving data.

20. The system of claim 13, wherein the controller is further configured to:
- analyze the loopback signal to determine the validity of the loopback signal,
- activate the indicator upon determining the loopback signal is valid, and
- detect a second input signal received over a cable.

* * * * *